Sept. 27, 1955     L. L. SPENCER, SR     2,718,785
LIQUID LEVEL GAUGE
Filed Feb. 5, 1954
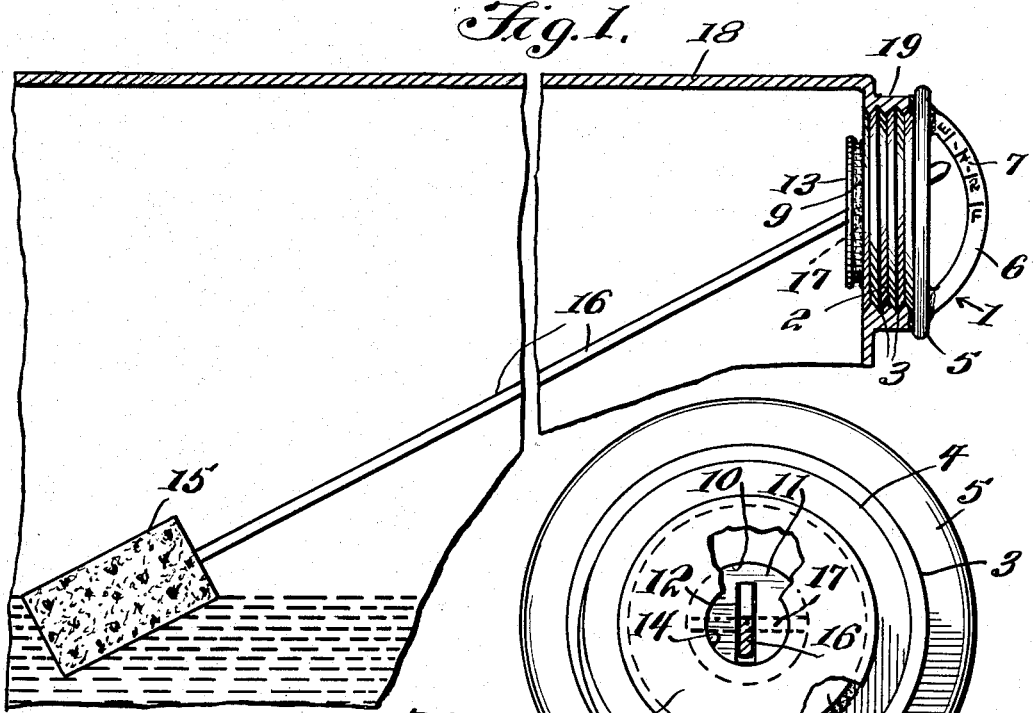
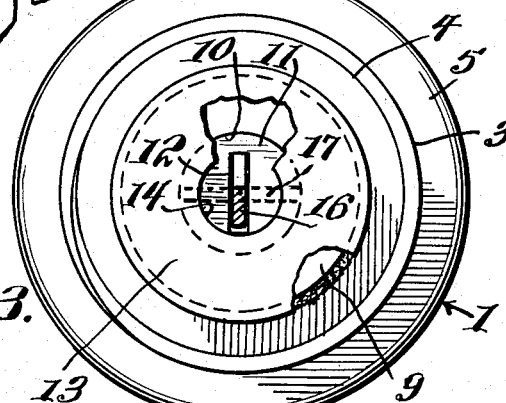
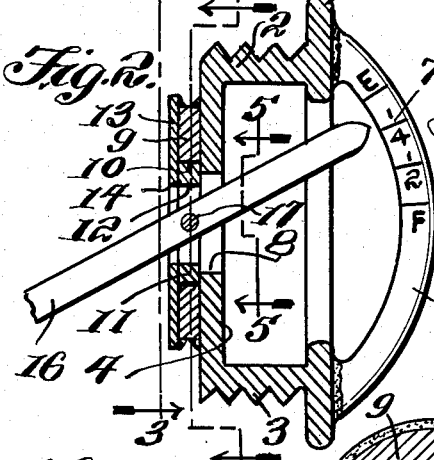
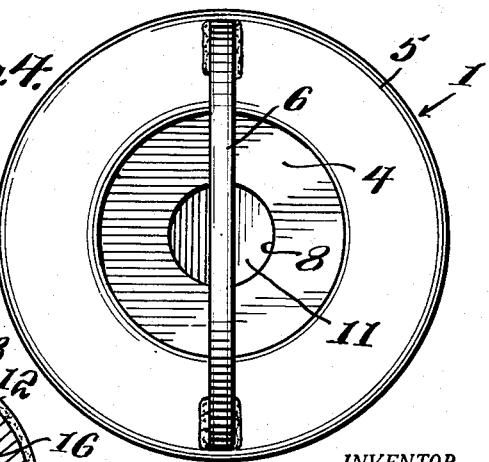
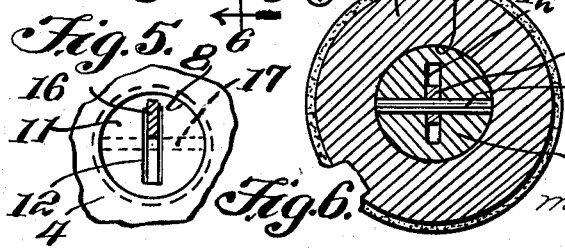
INVENTOR.
Lorn L. Spencer, Sr.
BY McMorrow, Berman & Davidson
ATTORNEYS

United States Patent Office 2,718,785
Patented Sept. 27, 1955

2,718,785

LIQUID LEVEL GAUGE

Lorn L. Spencer, Sr., Croswell, Mich.

Application February 5, 1954, Serial No. 408,498

2 Claims. (Cl. 73—317)

This invention pertains to gauges for indicating the liquid level in liquid containers including float operated index apparatus.

One of the primary objects of this invention is to provide a gauge of the type to which reference has been made, the gauge and its indexing means being easily removed and replaced before and after the container filling operations.

Another object of this invention is to provide in combination with a cap for a container liquid level indicating means.

A still further object of this invention is to provide a gauge of the type described, which is inexpensive to manufacture, noncomplex in manufacture and assembly, and durable under operating conditions.

Other and further objects and advantages of this invention will become more apparent from a consideration of the following specification when read in conjunction with the annexed drawing, in which:

Figure 1 is a side elevation of a liquid level indicating device constructed in accordance with the teachings of this invention and illustrated as applied to a horizontally positioned container illustrated in cross-section;

Figure 2 is an enlarged detail substantially medial cross-sectional view of the indicating device shown in Figure 1;

Figure 3 is a plan view of the inner end of the indicating device taken on the vertical plane of line 3—3 of Figure 2;

Figure 4 is a plan view of the outer end of the indicating device taken on the vertical plane of line 4—4 of Figure 2;

Figure 5 is a cross-sectional detail view taken on the vertical plane of line 4—4 of Figure 2; and Figure 6 is a cross-sectional view taken on the vertical plane of line 6—6 of Figure 2.

Referring now more specifically to the drawing, there is shown a liquid level indicating gauge constructed according to this invention. As seen in the drawing, the gauge comprises a closure 1 for the opening into the tank or container having a substantially circular side wall 2 externally threaded at 3, and a wall 4 which extends across one end thereof and is integral therewith. An integrally formed circumferential flange 5 projects outwardly away from the side wall 2 at the other end thereof and serves as a base for securing, as by welding, the opposite ends of a segment member 6 substantially diametrically thereacross. As seen in Figures 1 and 2, the member 6 bears indicia 7 on one side thereof.

The wall 4 is provided with a centrally positioned circular opening 8, and an annular element 9 having a circular aperture 10 is secured to that side of the wall 4 remote from the flange 5 with the opening and the aperture in coaxial alignment. As seen in Figure 2, the inner diameter of the annular element 9 is greater than the diameter of the opening 8 to leave exposed a marginal edge of the latter.

A circular disc 11 is mounted for rotation in the aperture 10 and is constructed with a diametrically extending elongated slot 12. From Figure 2 it is seen that the disc 11 has one of its sides abutting against the above mentioned marginal edge therethrough.

A circular plate 13 is welded or otherwise fixedly secured to the exposed side of the annular element 9 and is constructed with a circular aperture 14 having a diameter thereof of substantially the same dimension as the length of the longitudinal axis of the slot 12 and coincident therewith.

A float 15 of any conventional construction is connected to one end of an elongated lever 16 which passes through the aperture 14, slot 12 and opening 8, the other end thereof terminating in a point adjacent the segment 6. As seen in Figure 2, the lever 16 is pivotally connected adjacent its other end on the pivot pin 17 which extends diametrically through the disc 11 at substantially right angles to the longitudinal axis of the slot 12.

Reference numeral 18 indicates a horizontally elongated container having a hollow internally threaded boss 19 which communicates with the interior thereof, the boss being positioned adjacent the upper end of the container.

In operation, the container 18 is filled with a liquid to any desired level below the boss 19 and thereafter the float 15 and the adjacent end of the lever 16 is inserted through the boss and the cap is then threaded therein. By virtue of the fact that the lever 16 is pivotally supported on the disc 11 which is rotatably supported on the closure 1, the closure may be rotated in either direction relative thereto while the lever 16 may hang at any angle with relation to the closure as the closure is screwed into or out of the tank or container wall.

The float 15 causes the lever 16 to pivot on the pin 17 bringing the pointed end thereof to an adjusted position adjacent the indicia 7 to indicate the liquid level within the container.

Having described and illustrated one embodiment of this invention in detail, it will be understood that the same has been offered by way of example, and that the invention is to be limited only by the scope of the appended claims.

What is claimed is:

1. A liquid level indicating device for containers having an opening formed in a wall thereof, a closure for said opening, said closure comprising an elongated externally threaded cylindrical side wall for threaded engagement within said opening, said cylindrical side wall having an integral wall extending across one end thereof and having a substantially centrally disposed circular opening formed therein, a ring member secured to said wall and having its aperture coaxially aligned with said opening, a disc having a diametrically extending slot formed therein and having a side thereof engaging the marginal edge of said circular opening, a plate having a centrally positioned aperture, said plate extending across the other side of said disc and having its aperture coaxially aligned with said circular opening, a lever having an end thereof extending through said circular opening, slot and aperture, a float disposed within said container and connected with the other end of said lever, a segment member extending diametrically across the other end of said closure and having its opposite ends secured thereto, and indicia means positioned on said segment member.

2. A liquid level indicating device for containers having an opening formed in a wall thereof, a closure having an opening transversely therethrough for said opening in the container wall, float means disposed within said container, a lever having one end thereof secured to said float and having its other end extending through the opening in said closure, means mounted in said closure and operatively connected to said lever for pivotally mounting said lever therein adjacent said other end thereof and for rotation relative to said closure, and indicia bearing means carried by and diametrically bridging the opening through said closure on the end thereof remote from the container and adjacent said other end of the lever so that said other end of the lever defines an indicating arm cooperating with said indicia bearing means to show the level of a liquid in said container.

References Cited in the file of this patent

UNITED STATES PATENTS

| | | |
|---|---|---|
| 25,012 | Harris | Aug. 9, 1859 |
| 160,703 | Painter | Mar. 9, 1875 |
| 226,171 | Hastings | Apr. 6, 1880 |
| 1,560,318 | Reed | Nov. 3, 1925 |